United States Patent [19]

Polaneczky

[11] 4,353,462
[45] Oct. 12, 1982

[54] KEYED COMPUTER REEL AND SEALING RING ASSEMBLY

[76] Inventor: Aloysius J. Polaneczky, 7 Red Oak Rd., Oreland, Pa. 19075

[21] Appl. No.: 203,501

[22] Filed: Nov. 3, 1980

[51] Int. Cl.³ .................... B65D 45/32; B65D 85/67; B65H 75/02; B65D 55/02
[52] U.S. Cl. .................... 206/53; 215/206; 220/319; 206/1.5
[58] Field of Search ............. 206/53, 1.5, 398, 400; 220/319, 320; 215/206, 223

[56] References Cited

U.S. PATENT DOCUMENTS

| 3,450,290 | 6/1969 | Turner | 215/206 |
| 3,599,786 | 8/1971 | Osajnak | 220/319 |
| 3,833,114 | 9/1974 | Osajnak | 206/53 |

FOREIGN PATENT DOCUMENTS 940513  3/1956  Fed. Rep. of Germany ...... 220/319

Primary Examiner—William T. Dixson, Jr.

[57] ABSTRACT

A reel and sealing ring assembly for computer tape is provided with a unique formation on one edge of the sealing ring. Further provided is a complimentary formation on one flange of the reel and an uncomplimentary portion on the other flange of the reel. The uniqueness of these formations guards against mismatching the labeled sealing ring of one assembly with the labeled reel of another assembly.

5 Claims, 25 Drawing Figures

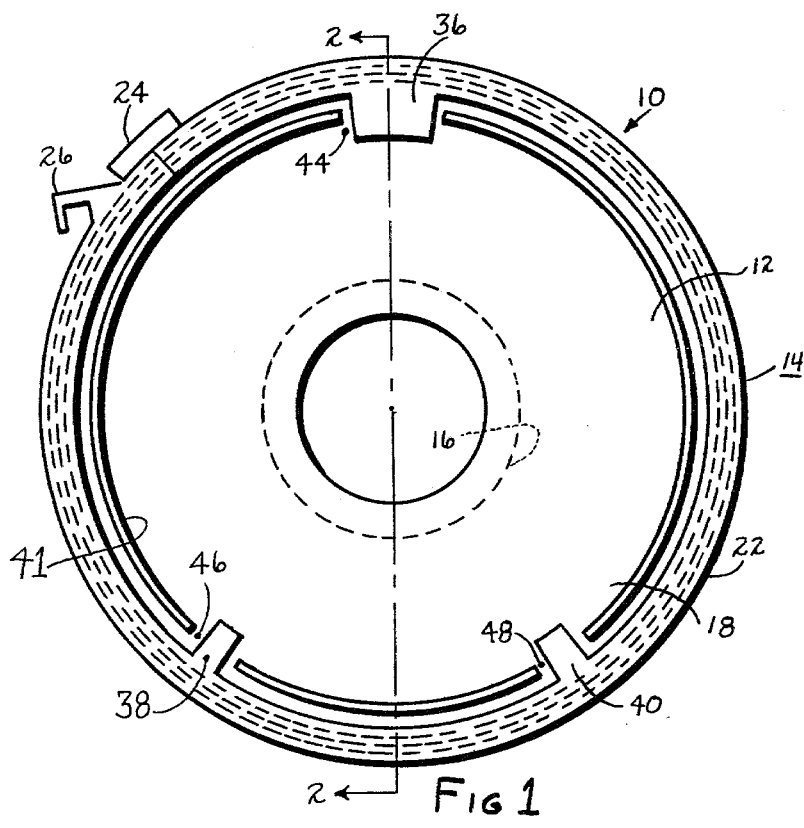
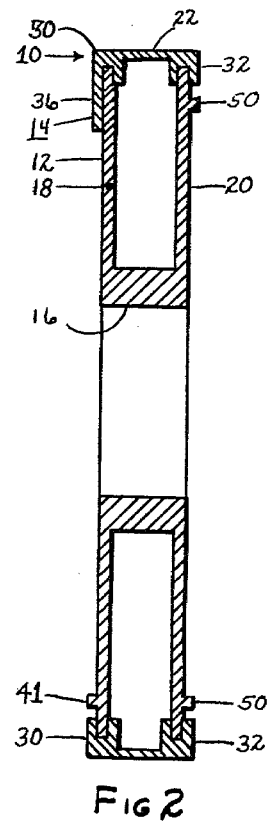
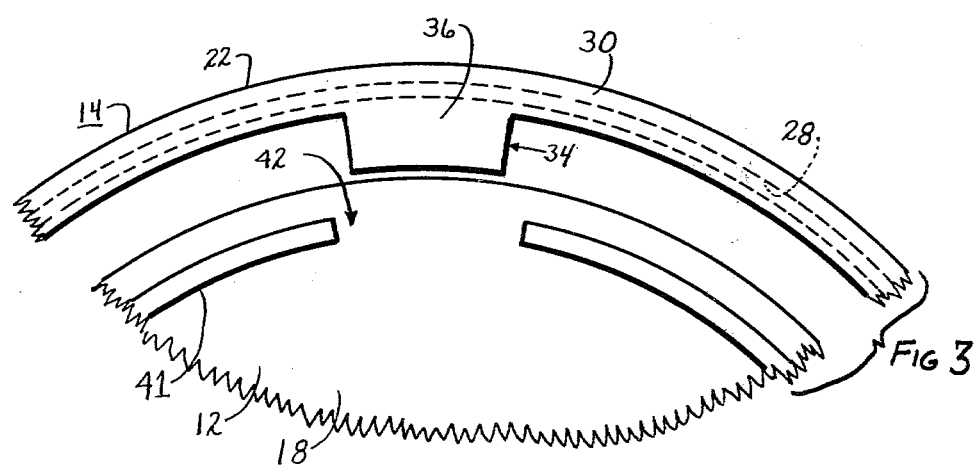

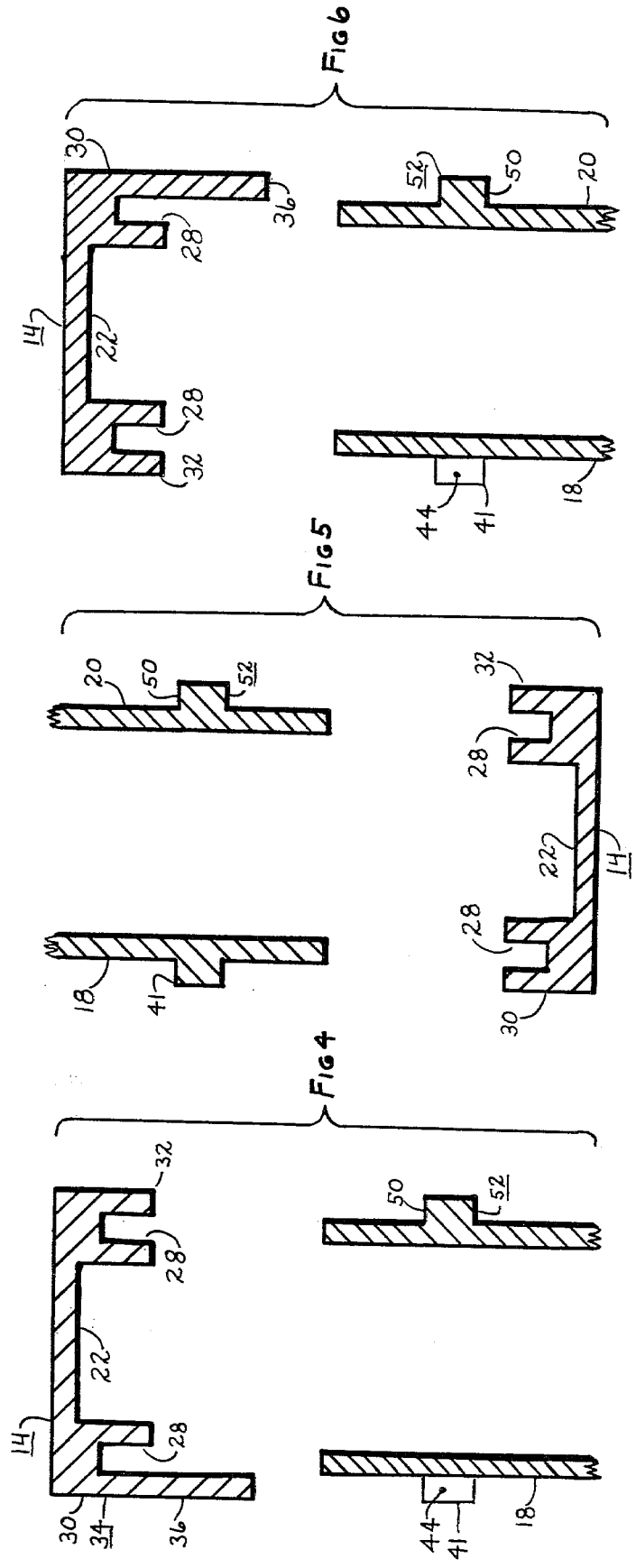

KEYED COMPUTER REEL AND SEALING RING ASSEMBLY

BACKGROUND

This invention relates to a method of keying a pattern into a complimentary sealing ring and reel which are normally mated when assembled at some time during their use. The pattern is such that it will allow the mating of a particular sealing ring with a particular complimentary reel, but will prevent the mating of a particular sealing ring with any other reel.

Various forms of sealing rings and reels are currently available for computer tape. It is general practice to store a particular reel, with its particular sealing ring attached, alongside other particular reels with their particular sealing rings attached. The reels with their attached sealing rings are stored side by side, flat side of a reel along flat side of an adjacent reel. The reels are usually made visually indentifiable by attaching a label. The particular sealing ring associated with a particular reel also has a label attached, the label bearing the same identification as contained on the label of the reel to which the sealing ring is attached. In storage the label of the sealing ring is exposed to view to distinguish one assembly from among its neighbors.

When it is desired to use a particular reel of computer tape on computer related equipment, the particular reel with its attached sealing ring, as identified by the visually exposed label on the sealing ring, is removed from storage. Once the reel and the attached sealing ring are removed from storage, the identity of the reel is verified by the label attached thereto.

When the reel is to be used on computer associated equipment, the attached sealing ring must first be removed. From that point in time, until the sealing ring is reattached, the identity of the reel is dependent upon its attached label. When the use of the reel is no longer required, its particular sealing ring is reattached and the assembly is returned to side by side storage with similar assemblies.

It is not uncommon for many reels of computer tape to be in use in a particular computer associated area at a given point in time. Also, it is not uncommon, when reassembling sealing rings and reels, after use, that the sealing ring reapplied to a particular reel is mistakenly that which came from another reel. Thus, when the assembly is returned to storage, the identity of the particular reel, as indicated by the label on the visually exposed edge of the sealing ring, does not correspond to the reel which the sealing ring encircles. Locating a reel in storage, mistakenly encircled by other than its own particular sealing ring, creates difficulty which this invention seeks to avoid.

BRIEF STATEMENT OF THE INVENTION

The primary object of the present invention is to provide a means of keying a particular sealing ring to a particular reel in a manner such that the particular sealing ring can successfully encircle only the particular reel by virtue of complimentary formations in the sealing ring and reel, and the particular sealing ring can be prevented from successfully encircling any other reel by virtue of encountering a non-complimentary and interfering formation in the other reel.

The sealing ring of the invention comprises a strip of flexible material, preferably plastic, which is configured with a pattern, or formation, which pattern is complimentary to, in a keyed sense, a pattern, or formation, in the flanges of the reel, also preferably plastic, which allows the particular sealing ring to be used only with a particular reel. The manner in which this is accomplished is through the application of combinatorial theory.

Although the invention is not so limited, the sealing ring of the disclosed embodiment is formed in a molding operation, in the manner and with materials normally used, except that the sealing ring has a formation molded into one of its edges. Likewise the reel is formed in a molding operation, in the manner and with materials normally used, except that the reel has a particular formation molded into one of its flanges. Each sealing ring so molded has its own unique pattern, which is complimentary to that which is molded into the reel. In this fashion, each sealing ring is unique and can be mated with only a reel possessing the identical complimentary pattern. At the time of molding, or shortly thereafter, each sealing ring and reel can be impressed or labled with a serial number which is descriptive of the pattern. In this fashion, the sealing ring and its reel are identified until the ultimate user affixes his own lables.

Although molding is mentioned as the particular method of incorporating the unique pattern into the sealing rings and reels, this invention is not intended to limit itself to molding as a method of accomplishment. The same invention could be accomplished by cutting, grinding or equivalent operation following a non-specific molding operation. However, the design impressed on the sealing ring and reel during molding must be such to allow a unique pattern to be constructed during a later operation.

The method developed for the particular keying formation will be apparent from the drawings and from a detailed description of the preferred embodiment.

DESCRIPTION OF THE DRAWINGS

In the drawings:

FIG. 1 is a plan view of a reel and sealing ring assembly embodying the invention;

FIG. 2 is a sectional view taken along line 2—2 of FIG. 1;

FIG. 3 is an exploded fragmentary view of the assembly of FIG. 1 taken on a larger scale;

FIGS. 4 and 5 are exploded views of the upper and lower fragments, respectively, of the assembly of FIG. 2;

FIG. 6 is another exploded fragmentary view of the assembly according to the invention, with the reel positioned as in FIG. 4, but with the sealing ring reversed and therefore in improper position for assembly;

Figure 7:
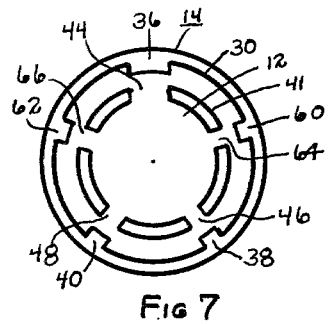
FIG. 7 is a schematic view of an assembly with formations of five slots and five tabs in one possible positional alignment.
Figure 8:
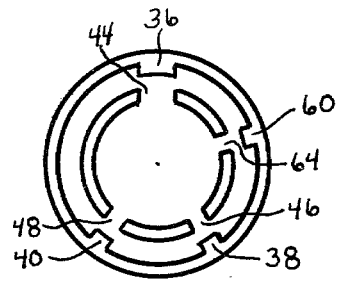
FIGS. 8 to 11 are schematic views similar to FIG. 7 but with formations of four slots and four tabs in various positional arrangements.
Figure 9:
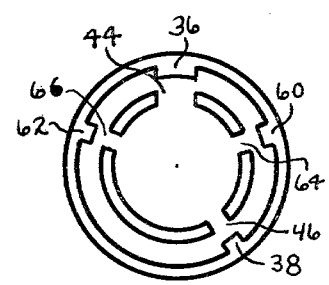
Figure 10:
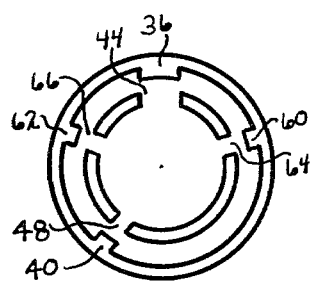
Figure 11:
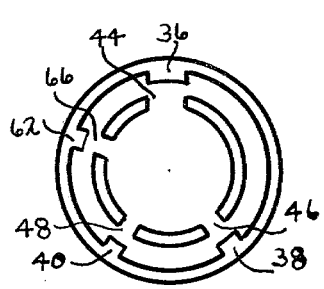
Figure 12:
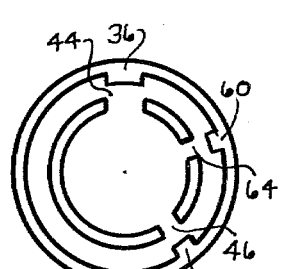
FIGS. 12 to 17 are additional schematic views similar to FIG. 7 but with formations of three slots and three tabs in various positional arrangements.
Figure 13:
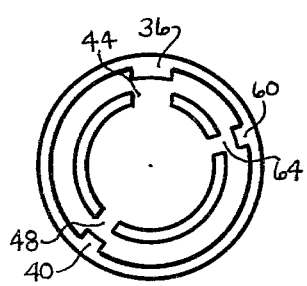
Figure 14:
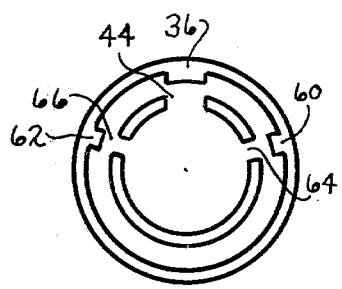
Figure 15:
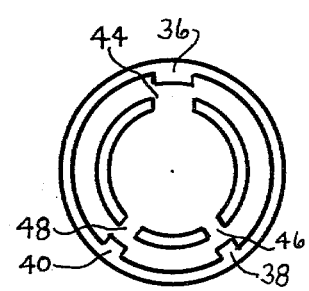
Figure 16:
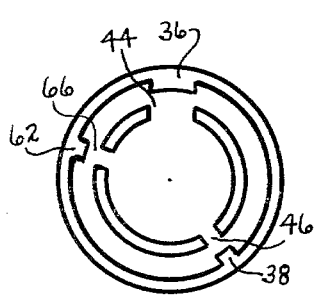
Figure 17:
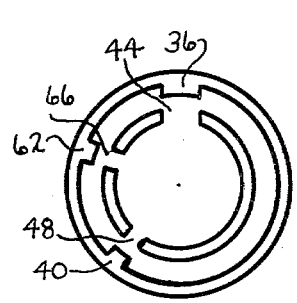
Figure 18:
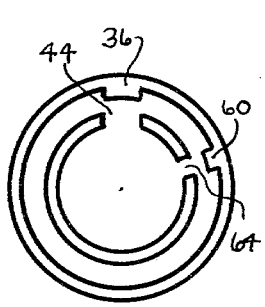
FIGS. 18 to 21 are further schematic views similar to FIG. 7, but with formations of two tabs and two slots in various positional arrangements.
Figure 19:
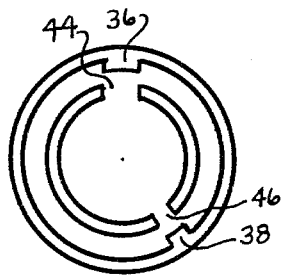
Figure 20:
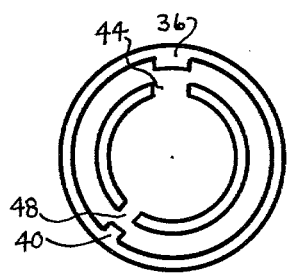
Figure 21:
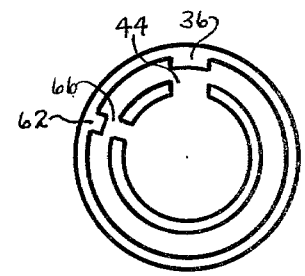

The schematic views of FIGS. 7 to 25 are not to scale, and are intended to show positional relationships of tabs and slots, not their relative sizes. The size relationships are shown in FIGS. 1 to 3.

DETAILED DESCRIPTION OF THE PREFERRED EMBODIMENT

Referring to the drawings, there is shown in FIG. 1 an assembly 10 comprising a reel 12 and a sealing ring 14. Ordinarially the reel 12 and ring 14 are both made out of plastic which possesses appropriate physical properties.

The reel 12 includes a central spool 16 and, as best seen in FIG. 2, a pair of spaced flanges 18, 20.

The sealing ring 14 comprises a strap 22 of flexible material, formed integrally with a latch 24 for drawing and holding the ends of the ring together and thus forming a ring which sealingly encircles the reel 12. Optionally, there is further provided a hook 26 for hanging the assembly 10 in storage.

Referring to FIG. 4, the sealing ring 14 may be seen in an enlarged cross sectional view having a groove 28 in each of its two edges 30, 32 as shown. Each groove 28 receives one of the flanges 18, 20 in sealing relationship, thus protecting the contents of the assembly 10.

The peripheral edge 30 of the strap 22 is provided with a first formation 34 in the shape of a primary tab 36 for keying or orienting the sealing ring 14 with respect to the reel 12. The first formation 34 is further provided with a plurality of secondary tabs 38, 40 as shown in FIG. 1. The tabs of formation 34 are received in correspondingly positioned matingly sized notches in a circular ridge 41, the latter being part of the second formation 42 in flange 18. The reference numeral 44 is applied to a primary notch associated with primary tab 36. Similarly referenced numerals 46, 48 are applied to the secondary notches associated with the secondary tabs 38, 40 respectively.

The circular ridge 41 is formed in flange 18 coencentrically with the circumference of reel 12 and comprises with the notches 44, 46, 48 a second formation, generally designated 42, which is complimentary to the first formation 34.

As may be seen in FIGS. 4 to 5, the tab 36 is disposed on one edge 30 of the sealing ring 14 and no tab or formation extends inwardly of the edge 32.

A full, unbroken circular or annular ridge 50 is formed in flange 20 of reel 12, such ridge being of diameter, form and dimension like that of annular ridge 41, thereby providing a third formation 52 on the assembly 10. (See FIGS. 2 and 4 to 6). The third formation 52 is complimentary to edge 32 of sealing ring 14 in that there can be no interference with a tab or formation along edge 32 since there are no tabs along edge 32. However, should the ring 14 be reversed during improper assembly to the reel 12, interference between tab 36 and ridge 50 will result as shown in FIG. 6. Stated another way, the third formation 52 is complimentary to the edge 32 and uncomplimentary to the first formation 34.

The pattern of tabs in the first formation 34 of the invention and of the notches in the second formation 42 of the invention must be such that it is necessary and sufficient that mating occur for the complimentary first and second formations of the correctly paired sealing ring and reel, but not allow mating when the particular sealing ring and reel are mispaired with any other non-complimentary sealing rings and reels, respectively.

FIG. 7 depicts, schematically, a sealing ring 14 sealingly encircling a reel 12 with the edge 30 of the sealing ring 14 having five tabs 36, 60, 38, 40, 62 of which one is a primary tab 36 while the remaining four tabs 60, 38, 40, 62 are secondary, and with the circular ridge 41 of the reel 12 having five notches 44, 64, 46, 48, 66 of which one is a primary notch 44 while the remaining four notches 64, 46, 48, 66 are secondary.

The notches and tabs, shown in FIG. 7, are equally spaced about the circumference, but need not necessarily be so.

The primary notch 44 and the primary tab 36, both at the top of FIG. 7, are wider than the remaining secondary notches 64, 46, 48, 62 and secondary tabs 60, 38, 40, 62, respectively. The positions occupied by the notches are termed notch positions while the positions occupied by the tabs are termed tab positions. The primary notch position 44 in the annular ridge 41 of the reel 12 is always nothced and the primary tab position 36 in the lip 30 of the sealing ring 14 is always tabbed. This serves as an orientation mechanism, as later will be illustrated.

Figure 22:
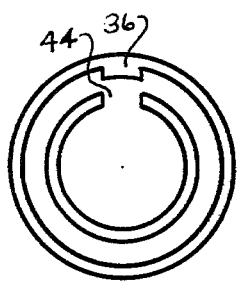
FIG. 22 is another schematic view similar to FIG. 7 but with formations of one tab and one slot in a matching position.

The secondary positions may or may not be notched, insofar as the annular ridge 41 is concerned, and may or may not be tabbed, insofar as the lip 30 of the sealing ring is concerned. The number of permutations, with four secondary positions is 2 raised to the 4th power, or 16. All of these permutations, for both the notching of the annular ridge 41, which in this illustration has one primary notch and four secondary notch positions, and the tabbing of the lip 30 of the sealing ring, which in this illustration, likewise, has one primary and four secondary tab positions, are shown in FIGS. 7 through 22. FIG. 7 shows all secondary positions notched and tabbed, FIGS. 8 through 11 show three of the secondary positions notched or tabbed. FIGS. 12 through 17 show two secondary positions notched or tabbed, FIGS. 18 through 21 show one secondary position notched or tabbed and FIG. 22 shows no secondary positions notched or tabbed.

Figure 23:
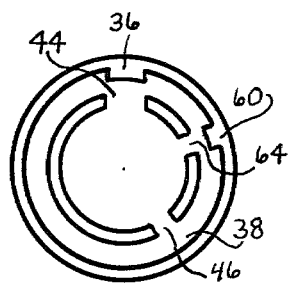
FIGS. 23 to 25 are still further schematic views similar to FIG. 7, with formations of various numbers of tabs and slots in a variety of positional arrangements.

However, all of the permutations shown in FIGS. 7 through 22 are not exclusive of each other in the mating sense. This is illustrated in FIG. 23, where the ring from FIG. 18 can be mispaired and falsely mated with the reel from FIG. 12. Here the primary tab 36 successfully mates with the primary notch 44, the secondary tab 60 successfully mates with the secondary notch 64, and while a secondary notch exists at 46, there is no secondary tab at position 38, and the ring can successfully be closed about the reel.

Close consideration of all the permutations in FIGS. 7 through 22 will disclose that all rings with a given number of secondary tabs can be successfully closed about some reels with a larger number of secondary notches, and, conversely, all reels with a given number of secondary notches can be successfully enclosed by some rings with a lesser number of tabs.

Further consideration of FIGS. 7 through 22 will disclose that a ring with a given number of secondary tabs can only be successfully mated with a reel with the same number of secondary notches, if and only if, the notches occupy the same secondary positions as the tabs on the sealing ring. Mathematically for $2N+1$ positions (where one position is the primary position), the maximum number of mutually exclusive permutations to produce unique non-complimentary non-mating patterns, unless an exact match of tabs and notches occur, is the combination of 2 N things taken N at a time. In the illustration being used in FIGS. 7 through 22, with five positions for notches and tabs, N is equal to 2. The maximum number of mutually exclusive patterns of tabs and notches is secured with all possible combinations of two primary notches and tabs, i.e. FIGS. 12 through 17 inclusive.

Figure 24:
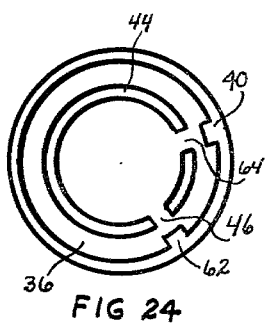

Under the two position example cited above, FIG. 24 displays the necessity of the primary notch and tab. FIG. 24 shows the two secondary tab sealing ring of FIG. 17 with the primary tab removed, the former tab position being indicated by 36. Also shown in FIG. 24 is the reel of FIG. 12 with the primary notch position 44 being filled in. Note that by rotating the reel and ring with respect to one another, the sealing ring may be successfully closed about the reel, although it is not desired that this be so. If the primary notch position 44 had not been filled in, and the primary tab position 36 had not had its tab removed, the false match could not have been obtained.

Figure 25:
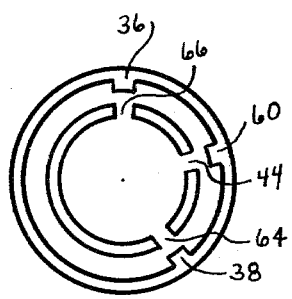

Under the two secondary position example shown above, FIG. 25 displays the necessity of the primary position tab and notch being wider than the secondary position tabs and notches. FIG. 25 shows the two secondary position sealing ring of FIG. 12 with the primary tab 36 narrowed to the width of a secondary tab. Also shown in FIG. 25 is the two secondary position notch reel of FIG. 14, with the primary notch 44 narrowed to the width of a secondary notch. Note that by rotating the reel and sealing ring with respect to each other, the sealing ring may be successfully closed about the reel, although it is not desired that this be so. If the primary notch 44 had not been narrowed, and the primary tab 36 had not been narrowed, the false mating could not have been secured.

As previously stated, for a given number of notch positions, 2 N+1, where 2 N positions are available for secondary formations, and one position is used for a primary formation, the maximum number of mutually exclusive mating patterns are secured among the sealing rings and reels when the number of secondary positions notched or tabbed are N. Under these circumstances the unique number of combinations is the combination of 2 N things taken N at a time. With a standard large tape reel used in the computer industry, which has a circumference of about 33 inches, with secondary positions, say, every one half inch, approximately 60 secondary positions are available, which leads to about 100,000,000,000,000,000 unique combinations of notches and tabs in these secondary positions.

What is claimed is:

1. A reel and sealing ring assembly for computer tape and the like, wherein said reel comprises a central spool and pair of spaced flanges, and wherein said sealing ring comprises a flexible strap for sealingly encircling the reel, and the improvement to ensure that a corresponding reel and strap are assembled, comprising:
  (a) a first formation on one edge of said strap;
  (b) a second formation, complimentary to said first formation on one of said flanges; and
  (c) a third formation complimentary to the other edge of said strap and uncomplimentary to said first formation.

2. An assembly according to claim 1 wherein said second formation comprises female portions and said first formation comprises male portions received by radial movement in said female portions when in complimentary relationship.

3. An assembly according to claim 2 wherein said third formation is without any female portions, whereby said first and third formations are uncomplimentary to one another, said reel interfering with the assembly of said sealing ring thereto when said first and third formations are in uncomplimentary relationship.

4. An assembly according to claim 1 wherein said second formation comprises a plurality of notches in an annular ridge formed on one of said first flanges coencentrically to the circumference of said reel, said first formation having a plurality of tabs extending inwardly from one edge of said strip into the respective notches, said third formation being a second annular ridge similar to said first annular ridge formed on the other of said flanges, said first and second formations being complimentary when engaged by radial movement during proper assembly of said ring and reel, and said first and third formations being uncomplimentary for interfering with improper assembly of said strap when said strap is in reverse position and said reel is not reversed.

5. An assembly according to claim 1 wherein the said first formation includes a plurality of tabs at a selected angular spacing to one another about the axis of the spool, said second formation including nothces for the reception by radial movement of said tabs disposed to one another at the same angular spacing, whereby said tabs and said notches are in complimentary relationship, said angular spacing being varied to provide a relatively unique complimentary relationship for a given reel and strap assembly.

* * * * *